United States Patent Office 2,893,980
Patented July 7, 1959

2,893,980

HIGH-MELTING INTERPOLYMERS FROM EPSILON-CAPROLACTAM

George E. Ham and Robert L. Sublett, Decatur, Ala., assignors to The Chemstrand Corporation, Decatur, Ala., a corporation of Delaware No Drawing. Application March 23, 1955
Serial No. 496,334

16 Claims. (Cl. 260—78)

This invention relates to interpolymers from epsilon-caprolactam and, more particularly, to the production of interpolymers from epsilon-caprolactam with melting points higher than that of polycaprolactam alone.

It is known to the art that polycaprolactam is capable of fabrication into high tenacity fibers with excellent chemical and physical properties. However, polymeric epsilon-caprolactam, or polycaprolactam, has a melting point of from 210° to 212° C., which is not sufficiently high for many desired applications of general purpose fibers, and hence has detracted from the use of polycaprolactam fibers generally.

In the past, attempts to form interpolymers containing polycaprolactam with other amide-forming components, such as polyhexamethylene adipamide and polyhexamethylene sebacamide have resulted in polymers which displayed a eutectic melting point well below the melting point of polycaprolactam alone. Hence, the interpolymers containing major proportions of caprolactam which have been discovered have had no utility in uses which required higher melting points than that of polycaprolactam alone. This low melting point eutectic has been particularly evident in compositions employing more than 40 percent of polycaprolactam or polyaminocaproic acid and, therefore, has led away from the use of any relatively large percentage compositions of these amide-forming monomers in any interpolymer from which a higher melting point than that of polycaprolactam alone was desired.

The primary object of this invention is the provision of modified polycaprolactam interpolymers of higher melting points than the melting point of polycaprolactam alone. Another object is the provision of such polycaprolactam interpolymers containing a major proportion of polycaprolactam. Still another object is the provision of such polycaprolactam interpolymers of greater utility than polycaprolactam itself for the formation of useful textile fibers. Other objects of the invention will become apparent from the description hereinafter.

It has now been found that interpolymers of polymerizable polyamide-forming reactants consisting of benzidine, a dicarboxylic acid, and at least 50 percent by weight of the polymer molecule of epsilon-caprolactam are fiber-forming polyamides of excellent physical properties. The interpolymers which are the subject of this invention are formed by heating at reaction temperature a polyamide-forming composition comprising benzidine, a dicarboxylic acid, and an amount of epsilon-caprolactam at least equal to the sum of the weights of the other two reactants. Dibasic carboxylic acids useful in forming the interpolymers of the invention are those dicarboxylic acids commonly employed for forming polyamides, and preferably those containing at least 6 carbon atoms in the molecule. Examples of such dibasic acids include adipic acid, sebacic acid, suberic acid, azelaic acid, pimelic acid, glutaric acid, isophthalic acid, and diglycolic acid.

The interpolymers of this invention which are most useful are those with melting points lying between that of polymeric epsilon-caprolactam at 210 to 212° C. and about 310 to 315° C. Interpolymers melting below the melting point of polycaprolactam would not be useful in those uses of general purpose textile fibers wherein polycaprolactam is itself at a disadvantage because of low melting point, and those interpolymers with melting points of much greater than 315° C. are too difficult to spin from the melt or too difficultly soluble to lend themselves to wet spinning processes. The molar ratios of the amide-forming components preferred in producing the interpolymers having melting points lying within the above-defined range are within the range of 1:1:2.5 to 1:1:55 for the benzidine, dibasic carboxylic acid, and epsilon-caprolactam respectively. Employing molar ratios within the stated range will result in interpolymers in which the polycaprolactam component will bear a weight ratio to the sum of the weights of the other two components within the range of 1:1 to 19:1. Such interpolymers constitute the preferred embodiments of this invention.

As stated above, the interpolymers of the present invention are produced by heating to reaction temperature a polyamide-forming composition comprising benzidine, a dicarboxylic acid of the class described, and in amount of epsilon-caprolactam at least equal to but not more than nineteen times the sum of the weights of the other two reactants. It is apparent that the epsilon-caprolactam monomer may be replaced by the monomeric epsilon-aminocaproic acid. Although the polyamide-forming reactants required for the production of the interpolymers of this invention do not require any catalyst other than heat for bringing about substantially complete polymerization, the rate of polymerization of these reactants may be accelerated by the use of well-known acid catalysts previously employed in the polymerization of polyamides. These acid catalysts are known to include the mineral acids, hydrobromic acid, benzene sulfonic acids, dialkyl sulfonic acids, beta-naphthylene sulfonic acids, and p-toluidine sulfonic acids.

The new interpolymers of this invention exhibit manifold advantages in the art of fiber-forming polymers. The new interpolymers or interpolyamides consist chiefly of polycaprolactam but have melting points ranging above the melting point of polycaprolactam fibers up to about 315° C. Having melting points within this range, these new interpolyamides are useful in those applications wherein the low softening or melting point of polycaprolactam fibers are a decided disadvantage. Such uses as high temperature filter cloths, heavy duty tire fabrics, and apparel fabrics resistant to high temperature treatments both wet and dry, are typical uses of my improved fiber-forming polymers. These new interpolymers may be formed into fibers and filaments by either dry spinning or wet spinning into suitable coagulating baths, or the two processes can be combined. Thus, the generally excellent physical properties of polycaprolactam have been modified in the production of the interpolymers so that they retain their high tenacity, low elongation, and other excellent properties while possessing melting points within a range above that of polycaprolactam.

The invention is described more specifically in the following examples in which the parts, proportions, and percentages are by weight unless otherwise specified.

*Example I*

A mixture of 1.84 grams (.01 mole) of benzidine, 1.41 grams (.01 mole) of adipic acid, and 3.3 grams (.029 mole) of monomeric epsilon-caprolactam was heated under an atmosphere of nitrogen for two hours at 222° C. and four hours at 288° C. At the end of this reaction period a fiber-forming interpolymer of good color and tenacity was obtained which had a melting point of greater than 300° C. The interpolyamide formed by this reaction had a composition by weight of approximately 50 percent polycaprolactam.

Example II

A mixture of 1.84 grams (.01 mole) of benzidine, 1.41 grams (.01 mole) of adipic acid, and 4 grams (.035 mole) of monomeric epsilon-caprolactam was polymerized in the same manner as set out in Example I above. The interpolymer so obtained had good color and tenacity and a melting point of 260–270° C. and represented an interpolyamide having a composition by weight of approximately 55 percent polycaprolactam.

Example III

A mixture of 1.84 grams (.01 mole) of benzidine, 2.02 grams (.01 mole) of sebacic acid, and 4 grams (.035 mole) of monomeric epsilon-caprolactam was polymerized in the same manner as set out in Example I above. The interpolymer so obtained had good color and tenacity and a melting point of greater than 300° C. and was an example of an interpolyamide with a composition by weight of approximately 51 percent polycaprolactam.

Example IV

A mixture of 1.84 grams (.01 mole) of benzidine, 1.41 grams (.01 mole) of adipic acid, and 4.9 grams (.043 mole) of monomeric epsilon-caprolactam was polymerized in the same manner as set forth in Example I above. The interpolyamide so obtained had a melting point of 245–255° C. and a composition by weight of approximately 60 percent polycaprolactam.

Example V

A mixture of 1.84 grams (.01 mole) of benzidine, 1.41 grams (.01 mole) of adipic acid, and 6.6 grams (.058 mole) of monomeric epsilon-caprolactam was polymerized in the same manner as set out in Example I. The interpolyamide so obtained had a melting point of 236–240° C. and a composition by weight of approximately 67 percent polycaprolactam.

Example VI

A mixture of 1.84 grams (.01 mole) of benzidine, 1.41 grams (.01 mole) of adipic acid, and 9.9 grams (.088 mole) of monomeric epsilon-caprolactam was polymerized in the same manner as set out in Example I. The resulting interpolyamide had a melting point of 222–226° C. and a composition by weight of approximately 75 percent polycaprolactam.

Example VII

This example illustrates the fact that other aromatic diamines when interpolymerized with a dibasic carboxylic acid and epsilon-caprolactam do not yield interpolyamides having a melting point within the desired range. A mixture of .01 mole p-phenylene diamine, .01 mole of adipic acid, and 7.6 grams (.067 mole) of monomeric epsilon-caprolactam was polymerized under an atmosphere of nitrogen for one hour at 222° C. and for two additional hours at 285° C. The interpolyamides so obtained had a melting point of only 195–200° C. and a composition by weight of approximately 75 percent polycaprolactam. The melting point of these interpolyamides was some 10 to 17° below that of polycaprolactam alone and hence would not serve in uses requiring polymers of higher melting points than polycaprolactam.

In the foregoing examples, the invention has been illustrated with particular reference to interpolyamides of epsilon-caprolactam and benzidine with adipic and sebacic acids, but it is to be understood that the invention is not limited to these particular acids but rather to the use of any of the dicarboxylic acids as a class and particularly those described above in this specification.

Although specific reference has been made to the use of the new interpolyamides for the formation of fibers or filaments, the invention is not restricted thereto, since the interpolyamides are useful for forming a variety of objects irrespective of the shape of the object. Typical objects which can be formed from these interpolyamides are bristles, surgical sutures, fishing leaders, fish lines, dental floss, ribbons, sheets, safety glass interliners, golf ball covers, and plasticized or otherwise modified solid compositions useful for making molded articles. Solutions of these interpolyamides in well-known polyamide solvents are useful for application as lacquers on wood, metal, glass, and other surfaces, for coating wire, fabrics, paper, regenerated cellulose, and the like, and for impregnating fabric, paper, and other porous materials. Solutions of the interpolyamides may be formed in any of the well-known solvents for polyamides in general, such as strong concentrated acids, phenols, cresols, and the like.

As many variations within the spirit and scope of this invention will occur to those skilled in the art, it is to be understood that the invention is not limited to the specific embodiments thereof except as set forth in the appended claims.

We claim:
1. An interpolyamide containing in polymerized form substantially equimolar amounts of benzidine and an aliphatic dicarboxylic acid containing at least four carbon atoms between the carboxyl groups and from 50 percent to 95 percent by weight of epsilon aminocaproic acid, said interpolyamide having a melting point in the range of 212° to 315° C.

2. An interpolyamide containing in polymerized form substantially equimolar amounts of benzidine and an aliphatic dicarboxylic acid containing at least four carbon atoms between the carboxyl groups and epsilon aminocaproic acid, the weight ratio of the epsilon aminocaproic acid units to the sum of the weights of the other polymer units being in the range of 1:1 to 19:1, said interpolyamide having a melting point in the range of 212° to 315° C.

3. An interpolyamide containing in polymerized form benzidine, an aliphatic dicarboxylic acid containing at least four carbon atoms between the carboxyl groups, and epsilon aminocaproic acid, the molar ratio of the said polymer units being within the range of 1:1:2.5 to 1:1:55 respectively, said interpolyamide having a melting point of from 212° to 315° C.

4. The interpolyamide of claim 1 wherein the aliphatic dicarboxylic acid is adipic acid.

5. The interpolyamide of claim 1 wherein the aliphatic dicarboxylic acid is sebacic acid.

6. The interpolyamide of claim 1 wherein the aliphatic dicarboxylic acid is suberic acid.

7. The interpolyamide of claim 1 wherein the aliphatic dicarboxylic acid is azelaic acid.

8. The interpolyamide of claim 1 wherein the aliphatic dicarboxylic acid is pimelic acid.

9. A filament formed from the interpolyamide of claim 1.

10. The process for producing high-melting interpolyamides containing from 50 to 95 percent epsilon aminocaproic acid units which comprises heating at reaction temperature a reaction mixture consisting of substantially equimolar amounts of benzidine and an aliphatic dicarboxylic acid containing at least four carbon atoms between the carboxyl groups and an amount of epsilon aminocaproic acid at least equal to but not more than 19 times the sum of the weights of the other two reactants, until the resulting interpolyamide has a melting point of from 212° to 315° C.

11. The process for producing high-melting interpolyamides containing from 50 to 95 percent epsilon aminocaproic acid units which comprises heating at reaction temperature a reaction mixture consisting of benzidine, an aliphatic dicarboxylic acid containing at least four carbon atoms between the carboxyl groups, and epsilon aminocaproic acid, the molar ratio of the said reactants being within the range of 1:1:2.5 to 1:1:55, until the resulting interpolyamide has a melting point of from 212° to 315° C.

12. The process of claim 10 wherein the aliphatic dicarboxylic acid is adipic acid.

13. The process of claim 10 wherein the aliphatic dicarboxylic acid is sebacic acid.

14. The process of claim 10 wherein the aliphatic dicarboxylic acid is suberic acid.

15. The process of claim 10 wherein the aliphatic dicarboxylic acid is azelaic acid.

16. The process of claim 10 wherein the aliphatic dicarboxylic acid is pimelic acid.

References Cited in the file of this patent

UNITED STATES PATENTS

| | | |
|---|---|---|
| 2,244,192 | Flory | June 3, 1941 |
| 2,252,555 | Carothers | Aug. 12, 1941 |
| 2,252,557 | Czerwin | Aug. 12, 1941 |